US012729574B2

(12) United States Patent
Corbetta

(10) Patent No.: US 12,729,574 B2
(45) Date of Patent: Sep. 8, 2026

(54) INVISIBLE HINGE FOR FURNITURE WITH SWING DOORS

(71) Applicant: DANCO S.P.A., Veduggio con Colzano (IT)

(72) Inventor: Roberto Corbetta, Veduggio con Colzano (IT)

( * ) Notice: Subject to any disclaimer, the term of this patent is extended or adjusted under 35 U.S.C. 154(b) by 0 days.

(21) Appl. No.: 19/189,629

(22) Filed: Apr. 25, 2025

(65) Prior Publication Data

US 2025/0347160 A1 Nov. 13, 2025

(30) Foreign Application Priority Data

May 8, 2024 (IT) ........................ 102024000010345

(51) Int. Cl.
*E05F 1/08* (2006.01)
*E05D 7/04* (2006.01)
(Continued)

(52) U.S. Cl.
CPC ........ *E05D 7/0407* (2013.01); *E05D 11/1021* (2013.01); *E05F 3/20* (2013.01)

(58) Field of Classification Search
CPC ... E05F 1/08; E05F 1/10; E05F 1/1041; E05F 1/1091; E05F 1/12; E05F 1/1223; E05F 1/1246; E05F 1/1253; E05F 1/1261; E05F 1/1292; E05F 1/14; E05F 5/006; E05F 3/20; E05F 3/18; E05D 11/1021; E05D 3/12; E05D 3/14; E05D 3/16; E05D 7/0407; E05D 7/0415; E05D 11/10; E05D 15/40;
(Continued)

(56) References Cited

U.S. PATENT DOCUMENTS 10,767,407 B2 * 9/2020 Salice ................. E05D 11/1064
11,486,176 B2 * 11/2022 Duer ..................... E05D 5/0276
(Continued)

FOREIGN PATENT DOCUMENTS

AT 525710 A1 6/2023
CN 110709572 A * 1/2020 ............. E05D 3/142
(Continued)

OTHER PUBLICATIONS

Search Report for Italian Priority Application No. 102024000010345, dated Dec. 13, 2024.

*Primary Examiner* — Chuck Y Mah
(74) *Attorney, Agent, or Firm* — EGBERT, MCDANIEL & SWARTZ, PLLC

(57) ABSTRACT

A hinge is described for the opening and closing of swing doors of furniture, including a fixed part shaped to be housed in a seat obtained in a horizontal plane of the furniture structure, such as a base or a top, and a movable part configured to be completely inserted into a seat obtained in a furniture door, the hinge being provided with a movement mechanism having a pair of levers or connecting rods connecting two pivot points provided on the fixed body of the hinge to two pivot points provided on the movable part to actuate the door in opening and closing, wherein lateral adjustment mechanisms are housed in the movable part of the hinge, the mechanisms being configured to perform, when the hinge is mounted, a translation of the door with respect to the furniture structure along a direction parallel to the front surface of the furniture.

11 Claims, 7 Drawing Sheets

(51) Int. Cl.
*E05D 11/10* (2006.01)
*E05F 3/20* (2006.01)

(58) Field of Classification Search
CPC ... E05D 15/401; E05D 15/405; E05D 15/406; E05D 15/42; E05D 15/58; E05D 15/565; E05D 3/142; E06B 3/5045; E05Y 2800/22; E05Y 2900/20; E05Y 2900/202; E05Y 2900/208; E05Y 2900/21; E05Y 2201/21; E05Y 2201/264; E05Y 2201/212; E05Y 2201/604; E05Y 2600/41
See application file for complete search history.

(56) References Cited

U.S. PATENT DOCUMENTS

| | | | | |
|---|---|---|---|---|
| 12,497,810 | B2 * | 12/2025 | Geller | A47B 95/00 |
| 2021/0087867 | A1 * | 3/2021 | Folie | E05D 3/142 |
| 2021/0123275 | A1 * | 4/2021 | Hammerer | E05F 1/1246 |
| 2022/0195776 | A1 * | 6/2022 | Giovannetti | E05D 3/142 |
| 2023/0349213 | A1 * | 11/2023 | Salice | E05D 5/02 |
| 2024/0263500 | A1 * | 8/2024 | Geller | E05D 3/142 |
| 2024/0287839 | A1 * | 8/2024 | Geller | E05D 3/142 |

FOREIGN PATENT DOCUMENTS

| | | | |
|---|---|---|---|
| CN | 214740665 | U * | 11/2021 |
| CN | 217326890 | U * | 8/2022 |
| EP | 3635206 | B1 | 5/2021 |
| EP | 3812545 | B1 | 2/2023 |
| IT | MI20100555 | A1 | 10/2011 |
| IT | 202200021156 | A1 | 4/2024 |

* cited by examiner

INVISIBLE HINGE FOR FURNITURE WITH SWING DOORS

CROSS-REFERENCE TO RELATED APPLICATIONS

Not applicable.

FIELD OF THE INVENTION

The present invention relates to a cushioned hinge for opening and closing swing doors of pieces of furniture.

BACKGROUND OF THE INVENTION

Hinges of the type referred to in the invention are widely known and used in furniture, such as a cabinet, with one or more doors with a vertical axis of rotation, with an opening also known as a flag. Such hinges are normally placed at the bottom and top of the furniture between the door and the fixed structure.

In order to esthetically improve the side of the piece of furniture and at the same time remove from it the encumbrances of conventional hinges, there is currently a tendency to use hinges with two connecting rods connecting a fixed part of the hinge—intended to be inserted into the base (lower plane) and into the top (upper or top plane) of the piece of furniture—and a movable part, which can be inserted in a seat formed in the door.

The two connecting rods act between the fixed structure of the piece of furniture and the door, and a spring, which is loaded during the opening movement of the door and exerts a thrust force on the door in the final closing phase of the latter, normally acts on one of said rods.

At least one deceleration device is also generally provided in the hinge, which in the following, for convenience, will also be referred to as shock absorber or damper, apt to guarantee a braking effect of the hinge during its closure, avoiding slamming of the door.

Hinges of this type are known, for example, from ITMI20100555A1 (Boffi), EP3812545B1 (Arturo Salice), EP3635206B1 (Effegi Brevetti), etc.

Generally, these hinges also provide means of adjusting the position between the parts of the cabinet and the fixed part and/or the movable part of the hinge. Specifically, once the hinge is mounted, the adjustment means allow adjustment of the cabinet swing door along a vertical direction Y and along directions X, Z perpendicular to said vertical directrix.

Normally, the vertical adjustment means (for movement along a direction Y) are provided in the movable part of the hinge, while the lateral adjustment means (for movement along the X axis) and front adjustment means (for movement along the Z axis) are entirely housed in the fixed part.

ITMI20100555A1, for example, discloses a hinge with vertical adjustment means housed in the movable part and comprising a threaded pin in cooperation with a threaded ring nut element housed between two flanges which are movable along the vertical axis Y by effect of the translation of the ring nut. By rotating the threaded pin, which in turn generates a translation of the ring nut, the position of the door can be adjusted with respect to the fixed structure of the piece of furniture.

The means for adjusting the door with respect to the cabinet structure along the Z axis (front adjustment) and X axis (lateral adjustment) are housed in the fixed part of the hinge and comprise, respectively, a screw and nut assembly arranged along the Z axis and an eccentric body acting along the axis X. The adjustment means are accessible to the user from the front side of the piece of furniture within which the hinge is mounted, and the adjustment is generally carried out by means of tools such as screwdrivers, Allen keys, etc.

EP3812545B1 also discloses screw-type front adjustment means and eccentric-type lateral adjustment means entirely housed in the fixed part of the hinge.

The fixed part of the known hinges, therefore, always has at least two types of adjustment means, the provision of which inevitably affects the overall dimension of the hinge and limits the space available for the functional elements of the hinge itself (elastic means, devices for decelerating the opening of the door, etc.).

AT525710 A1 (BLUM) describes a hinge provided with frontal and lateral adjustment means housed in the fixed part of the hinge and with a vertical adjustment device housed in the movable part, suitable for adjusting the alignment of the movable part with respect to the fixed part of the hinge along an articulation axis, the adjustment device being spaced from said articulation axis in the direction of the longitudinal extension of the movable part.

The applicant found that the elimination of a type of adjustment means from the fixed part of the hinge would bring several advantages from the point of view of implementation, practicality, and overall functionality of the hinge.

In particular, by moving the lateral adjustment means from the fixed part to the movable part, the shape of which conventionally has an unused space, the size of the hinge would be reduced by several millimeters in width (15-16 mm), with the consequent advantage of reducing both the production times and the milling times on the base and on the top of the piece of furniture to obtain the seat in which the fixed part is to be inserted.

Alternatively, or additionally, the space freed up by the adjustment means in the fixed part could be used to increase the efficiency of the hinge by modifying the arrangement of the already existing elements and/or by providing new ones. In addition, such a solution would also have advantages from the esthetic point of view, since the front of the hinge would have only one visible screw (only the front adjustment screw) instead of two.

It should also be noted that known hinges conventionally have a device for decelerating the movement of the door, generally in the form of a damping cylinder or damper.

ITMI20100555A1 illustrates a solution in which the damper is arranged laterally to the fixed part of the hinge from which it protrudes when the door is open, and is actuated by the contact of the same door when it is brought into closure. This solution is particularly convenient from the manufacturing point of view and allows to obtain an excellent damping effect, but it has the disadvantage of operating only near the total closure of the door. Moreover, this solution can be unesthetic for some users.

EP3812545B1 describes a hinge with a damper entirely housed in the fixed part, which is actuated by a oscillating lever connected to the movement of one of the two connecting rods. This hinge has the esthetic advantage of not having elements projecting from the fixed part of the hinge, but is structurally complex, due to the presence of the transmission lever for operating the damper.

Moreover, due to the size of the damper and of the linkages via oscillating levers, the damping effect obtained is generally lower than that achieved by a solution such as that of ITMI20100555A1, and is therefore intended for limited and pre-established applications. The arrangement of the elements is quite rigid and does not allow the user to calibrate the degree of damping.

In order to overcome the drawbacks of known hinges, the Applicant has already developed a hinge of the aforesaid type in which the deceleration device ensures an improved braking action, preventing the connecting rod from impacting thereon when the spring thrust is maximum. In this hinge, the deceleration device is housed in the fixed body and has an externally projecting part, so that one of the two connecting rods acts directly thereon to exert a braking action during the closing of the door.

This solution, which is the subject of Italian patent application No. 102022000021156, unfortunately does not solve the drawback linked to the adaptability of the hinge, in the case where for example a greater damping is required, which would be for example guaranteed by a shock absorber such as that of ITMI20100555A1.

It would therefore be convenient to have a swing door in which the user is able to choose the degree of damping according to the purpose of use.

Not least, it is pointed out that the known hinges have a disadvantage linked to the installation, and in particular to the fixing of the fixed part of the hinge to the cabinet.

In such applications, the fixed part generally has a flat configuration such as to be inserted in a seat formed in the thickness of the top or base of a piece of furniture. This seat is always obtained by milling.

In order to be fixed to the seat, the fixed part has at least one flange protruding with respect to the main body which is provided with at least one hole. The hinge is fixed to the piece of furniture by means of screw means which pass through the hole of the flange and engage in a hole suitably provided for this purpose in the piece of furniture, also obtained by milling.

In addition to having the disadvantage of having to provide additional flanges and holes, the fixing of these hinges is based exclusively on the pressure that the screw exerts on the hole of the flange, where a very high stress condition is created.

It is therefore necessary to consider an alternative method of fixing the fixed part of the hinge to the seat.

SUMMARY OF THE INVENTION

From the foregoing, the disadvantages of prior art hinges applied to horizontal seats of furniture with swing doors are evident.

It is an object of the invention to provide a hinge for furniture with swing doors that can overcome the drawbacks listed above.

In particular, it is an object of the present invention to provide a hinge for furniture with swing doors capable of providing for a different and improved arrangement of the means for lateral adjustment of the movable part with respect to the fixed part.

Another object of the invention is to provide such a hinge with an improved structure, in which the lateral adjustment means can be housed easily and efficiently.

Another object of the present invention is to provide a hinge of the above type comprising at least one device for decelerating the movement of the door, in which the selected device can be arranged alternately in two seats provided in the hinge and operated in different ways according to the user's requirements.

Still another object of the invention is to provide means of fixing the hinge, in which the fixed part does not provide perforated flanges for installation, reducing space requirements and increasing the performance.

These and other objects are achieved by a hinge for furniture with swing doors having the features listed in claim 1.

Substantially, the present invention relates to a hinge for opening and closing swing doors of furniture, comprising a fixed part shaped to be housed in a seat formed in a horizontal plane of the structure of a piece of furniture, such as a base or a top, and a movable part configured to be inserted into a seat obtained in a door of the piece of furniture, said hinge being provided with a movement mechanism comprising a pair of levers or connecting rods connecting two pivot points provided on said fixed body of the hinge to two pivot points provided on the movable part to actuate the door in opening and closing, wherein said movable part of the hinge accommodates lateral adjustment means configured to perform, when the hinge is mounted, a horizontal translation of the door with respect to the structure of the piece of furniture along a direction X parallel to the front surface of the piece of furniture defined by the thicknesses of base, top and side walls.

Advantageous embodiments of the invention appear from the dependent claims.

BRIEF DESCRIPTION OF DRAWINGS

Further features of the invention will become clearer from the following detailed description, referring to purely exemplary and therefore non-limiting embodiments thereof, illustrated in the attached drawings, in which.

DETAILED DESCRIPTION OF THE INVENTION

Figure 1:
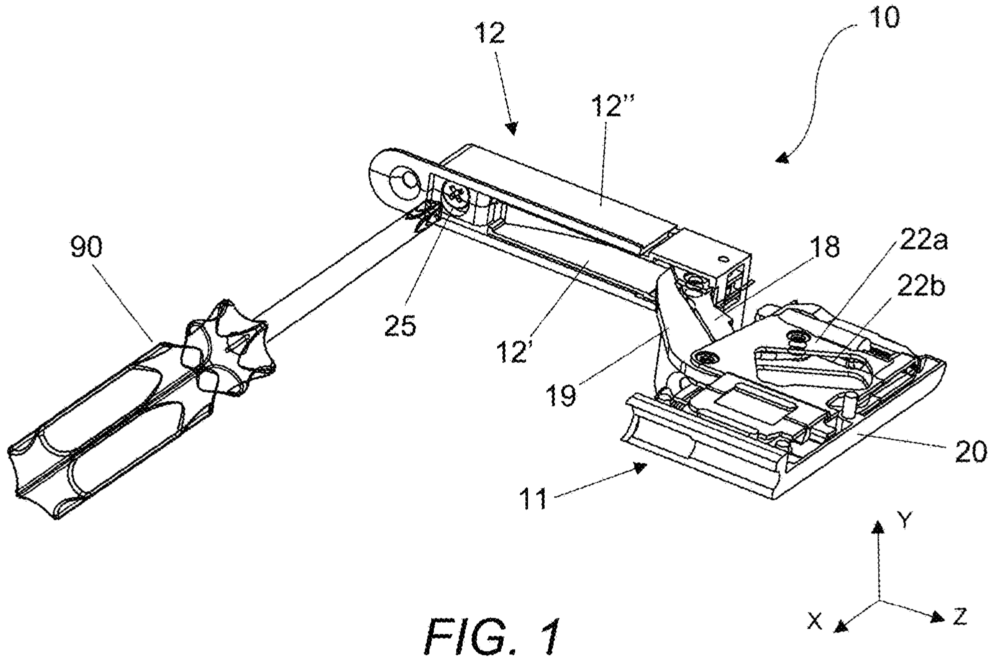
FIG. 1 is an axonometric view showing a hinge according to the invention, in an open condition, without the upper casing of the fixed part, in which a tool for lateral adjustment of the movable part of the hinge is also shown.

With particular reference to FIGS. 1-9, a hinge for swing doors according to the invention, denoted globally by reference number 10, comprises a fixed body or part 11 which is to be inserted in a seat formed in a horizontal plane of furniture (base or top, not shown), and a movable body or part 12 which instead is to be inserted into a seat of the door, also not shown in the figures.

The fixed part 11 is generally made of two enclosures or half-shells, a lower one, indicated by the reference numeral 20 in FIGS. 1-9, and an upper one 20', which in said figures has been removed to show the components provided in the fixed body. The half-shells receive a pair of plates, substantially identical to each other, specifically an upper plate 22*a* and a lower plate 22*b*, between which the various components of the hinge are arranged.

Figure 5B:
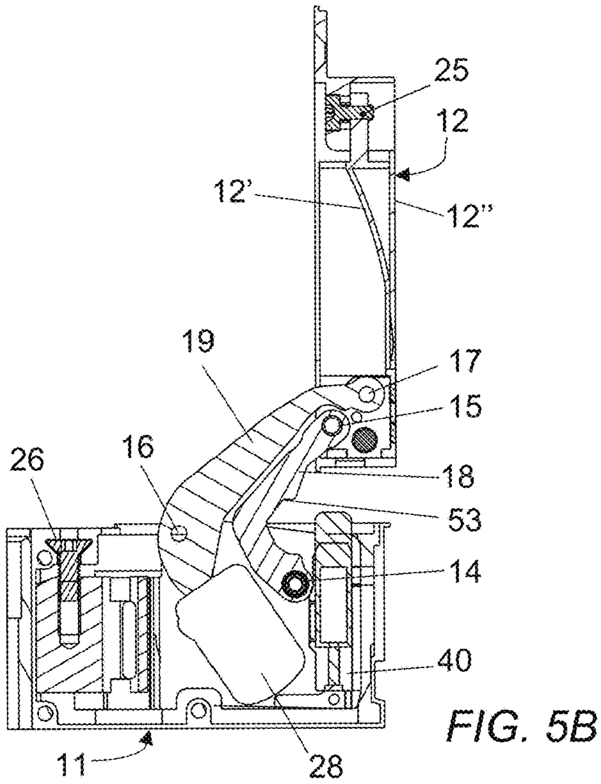
FIG. 5B is a sectional view of the hinge taken along line B-B of FIG. 5A.

The hinge 10 is of the so-called four-pin type 14, 15, 16 and 17, better shown in the cross-sectional view of FIG. 5B, wherein the movable part 12 intended to be inserted in a door is constrained to the fixed part 11 by means of a pair of rockers or connecting rods 18, 19, so as to accompany the door during the opening and closing movement. Preferably, the two connecting rods 18, 19, which join the two parts 11, 12 of the hinge 10, have a slightly arched shape in the same direction.

As will be understood, the hinges illustrated in the figures are all of the "fully concealed" or "completely invisible" type, in that they have a flat fixed part so as to be fully insertable into the thickness of the base or top of a piece of furniture and the connecting rods extend along a plane perpendicular to the articulation axes.

The hinge shown in the figures is designed to be mounted in the upper left corner or in the lower right corner of a piece of furniture. Clearly, by specularly varying the arrangement of the components, the same hinge is adapted to be mounted in the other two corners of the piece of furniture.

Figure 5A:
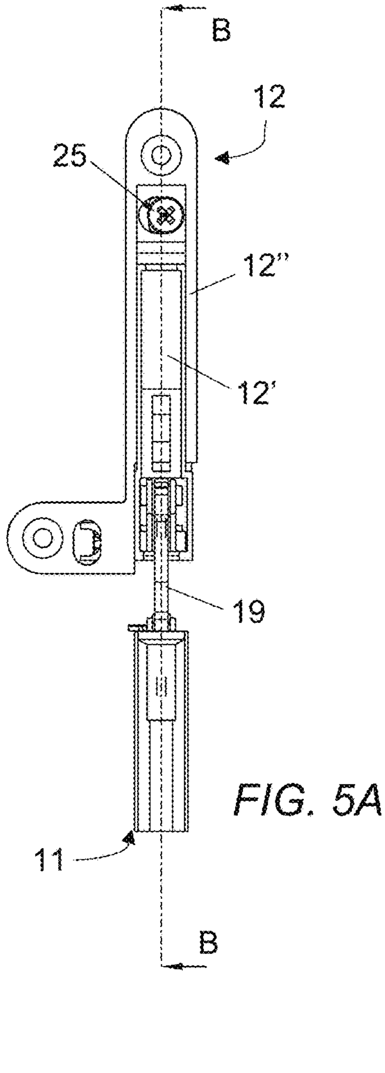
FIG. 5A is a side profile view of the hinge taken from the left side of FIG. 3, in the direction of arrow A.

With reference to the plan views of FIGS. 3-5A and to FIG. 5B, which is a sectional view along the line B-B of the side view of FIG. 5A, the main components of the hinge 10 will be briefly described, although not essential and not binding for the purposes of the invention.

The ends of the connecting rod 18, which we shall also call inner connecting rod, are articulated respectively to a pivot point 15 provided in the movable part 12 of the hinge and to a pivot point 14 in the fixed part 11.

The connecting rod 19, which we shall also call outer connecting rod, is instead articulated to the pivot pin 17 carried by the movable part 12 of the hinge at one of its ends and to the pin 16 of the fixed part 11 to be inserted in the body of the piece of furniture at an intermediate point thereof.

Conventionally, one of the two connecting rods can be operatively connected to elastic means provided to guide the door during closing movement. In the figures, a hinge 10 is shown in which one end of the outer connecting rod 19 is under the action of a compression spring (not shown) provided in a seat 28 formed in the fixed body 11. This arrangement is purely indicative, being the provision of elastic means operatively connected to one of the connecting rods well known to one skilled in the art.

In a still conventional manner, in order to prevent the door from slamming against the fixed structure of the piece of furniture during closure, due to the force exerted by the spring, at least one deceleration device 50 can be provided in the hinge 10, which is configured to soften the closing movement of the door.

In particular, in the embodiment shown in the figures, without any limitation, the deceleration device 50 is represented as a damper comprising a cylinder-piston assembly, constrained to slide linearly in a seat 40 formed between the two plates 22*a*, 22*b*, and is actuated by a nose 53 of the inner connecting rod 18, which acts against a suitably shaped extension 58 of the damper cylinder.

Again, the presence of a decelerating device in hinges of the type described herein is an aspect known to the person skilled in the art, and various other configurations can be provided without limiting the scope of the invention.

The hinge 10 comprises, in a fully integrated manner, means for adjusting the position of the door with respect to the structure of the cabinet along the three Cardinal axes X, Y, Z, shown in FIG. 1, in which Y represents the vertical direction of the door, while X and Z, orthogonal to the axis Y, indicate the lateral and front directions, respectively.

Figure 2:
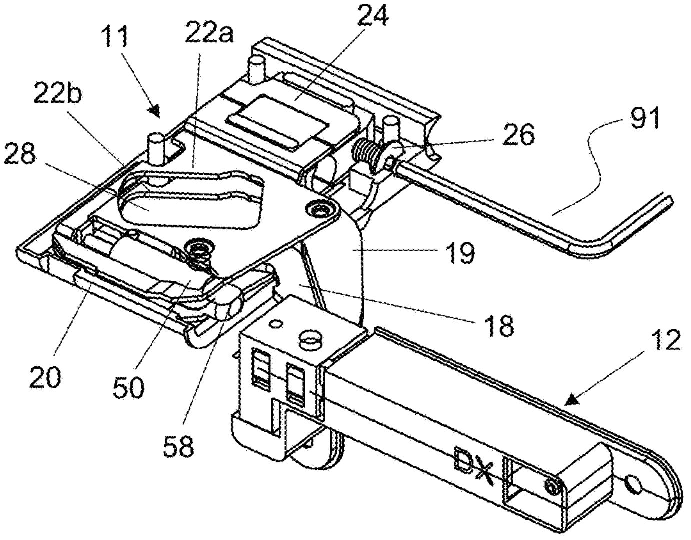
FIG. 2 is an axonometric view of the hinge of FIG. 1, rotated by approximately 180°, in which a tool for front adjustment is also shown.

The front adjustment means, which allow to modify the position of the door along the axis Z, conventionally comprise a screw-and-nut system provided in the fixed body 12. In particular, a nut body 24 completely housed in the fixed part 12 is constrained to the plates 22*a*, 22*b* and a screw 26 is inserted therein, accessible from the outside for adjustment by the user by means of a tool 91 as shown in FIG. 2.

Figure 2A:
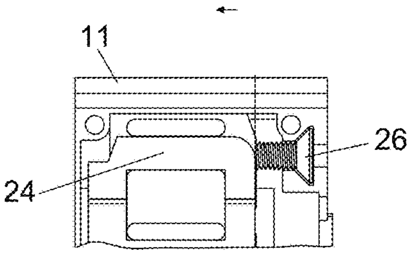
FIGS. 2A and 2B are partial top plan views of the hinge of FIG. 2 with the front adjustment means in two different operating positions.
Figure 2B:
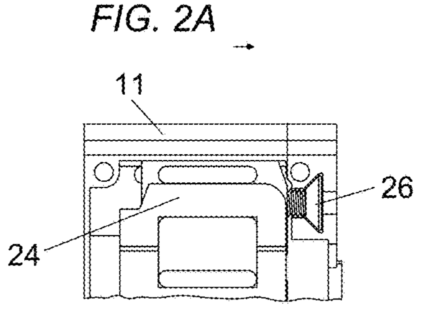
Figure 3:
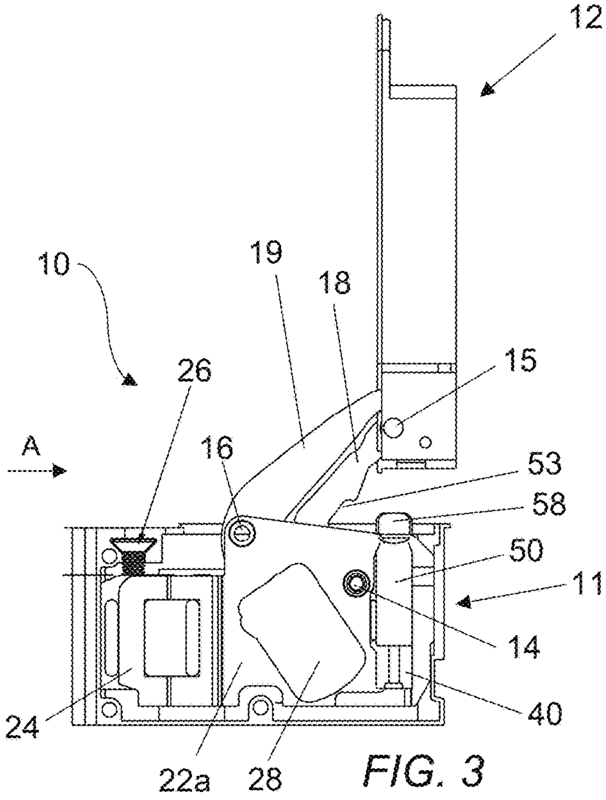
FIGS. 3 and 4 are top and bottom plan views, respectively, of the hinge of FIG. 1.
Figure 4:
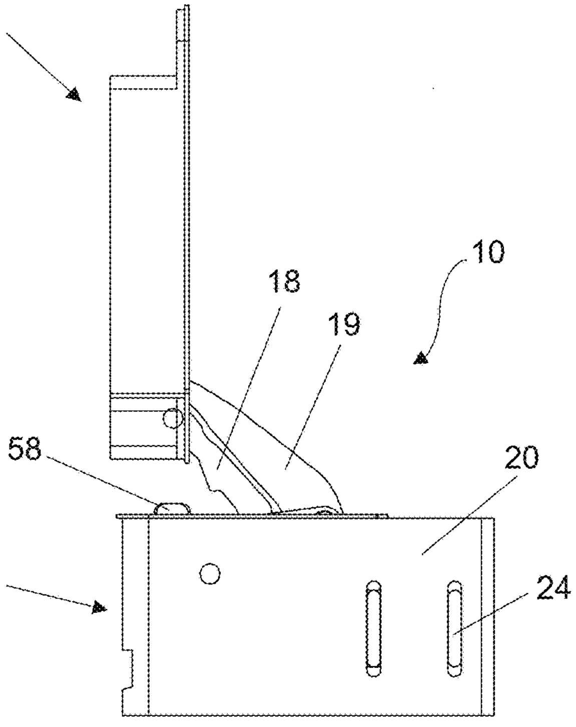

FIGS. 2A and 2B are schematic representations showing the nut body 24 in two different positions along the axis Z, having made a front adjustment by means of the screw 26.

Figure 8:
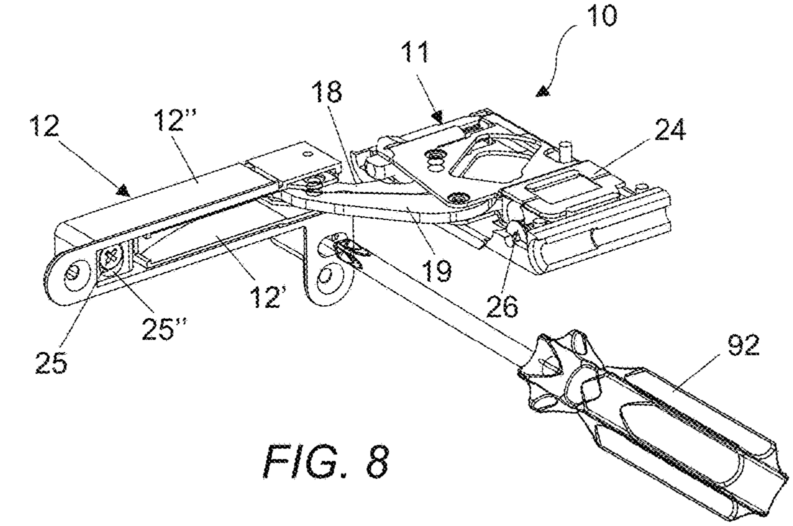
FIG. 8 is an axonometric view of the hinge of FIG. 1, rotated by approximately 90° counterclockwise, in which a tool for vertical adjustment is also shown.
Figure 9:
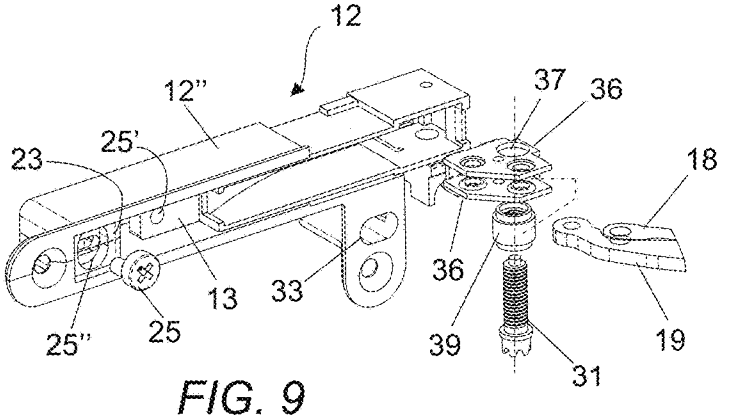
FIG. 9 is a partially exploded axonometric view of the movable part of the hinge shown in FIG. 8.

The means for adjusting the door with respect to the structure of the piece of furniture along the vertical axis, which are to be considered substantially known in themselves, are best evident with reference to FIGS. 8 and 9. They are entirely housed in the movable part 12 of the hinge with which they interact and conventionally comprise an at least partially threaded pin 31 and a pair of support flanges 36, in this case obtained from a U-shaped folded sheet metal, on which the ends of the connecting rods 18, 19 are pivoted at the pivot points 15, 17 described above. The threaded pin 31 passes through holes 37 formed in the flanges 36 and is constrained to the movable part 12 so that it can only rotate with respect to it. Between the flanges 36 there is a threaded ring 39, possibly made in a single body with the flanges, with which the thread of the pin 31 engages.

As shown in the figures, the movable part of the hinge 10 has a slotted opening 33 for the access of a tool 92 for vertical adjustment, which allows the threaded pin 31 to be rotated. Screwing the threaded pin 31 into the threaded ring 39, which is arranged in a fixed position between the flanges 36, causes a vertical translation of the moving part 12, obtaining, in a standard way, a vertical adjustment of the door.

In a completely innovative way with respect to the known hinges, the hinge 10 has means for adjusting the lateral position also provided in the movable part 12 and no longer in the fixed part.

Figure 6:
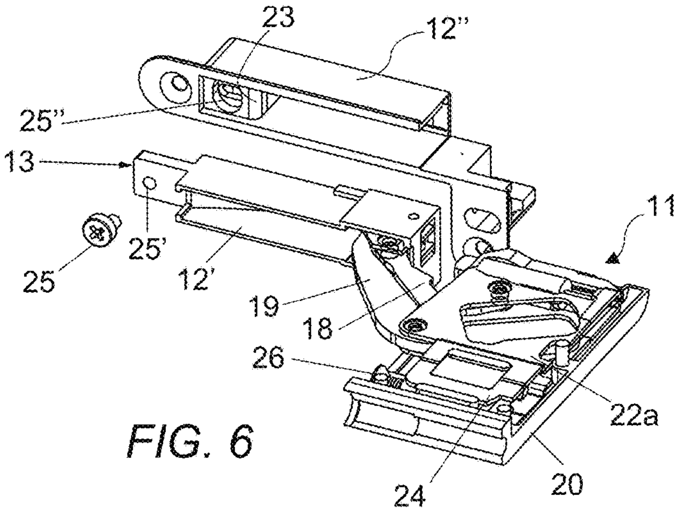
FIG. 6 is a partially exploded axonometric view of the hinge of FIG. 1.

For this purpose, the movable part 12 of the hinge is advantageously formed by joining a first body 12' and a second body 12", as better shown in FIG. 6 and in FIG. 9.

The first body 12' has a substantially elongated box-like shape and a first end thereof is intended to receive the flanges 36 to which the connecting rods 18, 19 are pivoted.

The second body 12" also has a hollow box-like shape such that it accommodates and wraps around the first body 12' and generally has a classic "L-shaped" configuration for being fixed by means of screws in a seat formed in a door.

The first body 12' has a protruding flange 13 at the end opposite to that intended to receive the connecting rods 18, 19 in which a hole 25' is provided for the insertion of an eccentric body 25, which will be better illustrated shortly.

The conformations of the two bodies 12', 12" are such that the coupling takes place with lateral sliding, as is clearer from the representation of FIG. 9.

The second body 12" in turn has at the end of the hollow space a housing 23 provided with a hole or window 25" such that, after the sliding coupling between the first body 12' and the second body 12" has occurred, the hole 25' on the flange 13 is located behind the window 25", through which the eccentric body 25 is mounted to engage the hole 25'.

With this arrangement, by acting on the eccentric body 25 it is possible to obtain a sliding of the second body 12" with respect to the first body 12'.

Figure 7A:
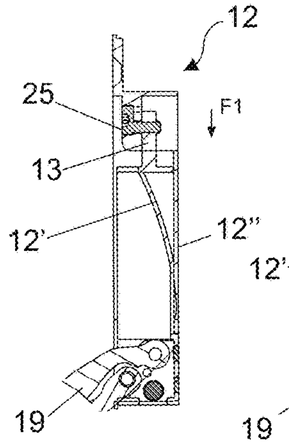
FIGS. 7A and 7B are sectional views of the movable part of the hinge of FIG. 5B showing the lateral adjustment means in two different positions.
Figure 7B:
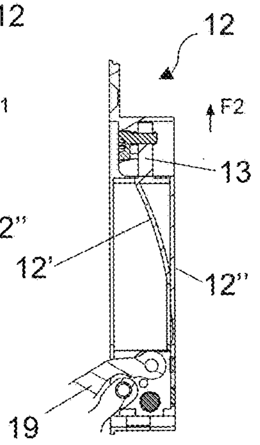

For example, by rotating the eccentric body 180° starting from the position shown in FIG. 7A, the configuration of FIG. 7B is obtained, in which the second body 12" has undergone a translation in the direction indicated by the arrow F1 (substantially equivalent to the X direction in FIG. 1). Starting from the position of FIG. 7B, a rotation of the eccentric body 25, in the opposite direction to the previous one, produces a linear sliding of the second body 12" with respect to the first body 12' in the direction of the arrow F2, which is brought back into the configuration of FIG. 7*a*.

Recalling that the second body 12" is fixed to the door and the first body 12' is integral with the body of the piece of furniture (by means of the connecting rods 18, 19 that articulate the movable part 12 of the hinge and the fixed part 11, which is installed in the piece of furniture), the movement illustrated above results in a horizontal movement of the door relative to the piece of furniture. This movement, when the piece of furniture is closed, is equivalent to obtaining a lateral adjustment of the door, i.e. the closed door moves along the direction X shown in FIG. 1.

The hinge according to the present invention, therefore, is able to achieve the intended objects, allowing to carry out an efficient adjustment of the door along the three Cartesian axes, even without lateral adjustment means arranged in the fixed part. The transferal of such means in the movable part of the hinge allows space previously substantially unused in the movable part to be exploited, so that the space previously intended for lateral adjustment in the fixed part can be reduced or destined for other use.

This space can be used, for example, for the provision of a seat for a second decelerator, according to another aspect of the invention.

Figure 10:
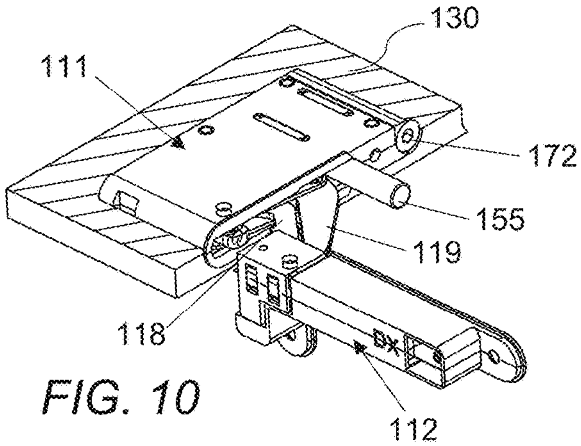
FIG. 10 is an axonometric view of a hinge according to a further aspect of the invention in which a projecting damper actuated by the movable part of the hinge is provided, with the fixed part applied to a base or top of a piece of furniture (partially shown).

FIG. 10 is an axonometric view of a hinge 110 for a piece of furniture with swing doors comprising a movable part 112 connected to a fixed part 111 by means of a pair of connecting rods 118, 119. In the figure the fixed part is inserted in a seat provided in the base or in the top 130 of a piece of furniture, shown only partially for illustrative purposes.

The hinge 110 generally features a structure and components similar to the hinge 10, which will therefore not be described in detail. In addition, the hinge 110 provides a decelerator 155 which, when the door is open, projects substantially from the fixed body 111.

Figure 11A:
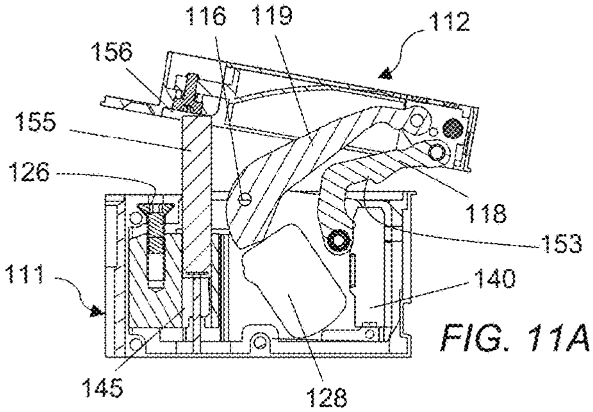
FIGS. 11A and 11B are sectional views of the hinge of FIG. 10, in a condition close to closure and in a fully closed condition, respectively.
Figure 11B:
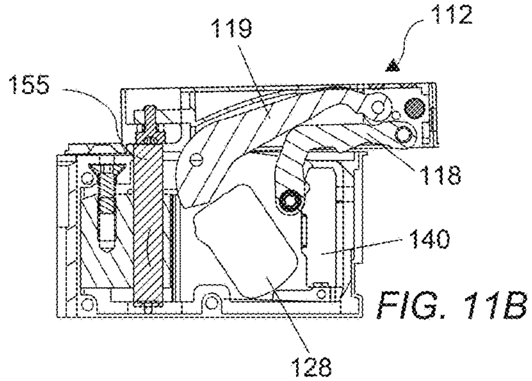

The configuration of the decelerator 155 is best shown in FIGS. 11A and 11B, which are sectional views of the hinge 110 taken along a horizontal plane when the movable part is in the closure phase and when the movable part is closed, respectively.

As shown in these figures, the decelerator 155 is housed in a vertical seat 145 provided between the pivot point 116 of the connecting rod 119 and a front adjustment screw 126 of the hinge, similar to the screw 26 described above.

The decelerator 155 is actuated during closing phase directly by the movable part 112, with the contact which preferably occurs at a groove 156 formed at the access point to an eccentric body provided for lateral adjustment as described with reference to the hinge 10.

Figure 12A:
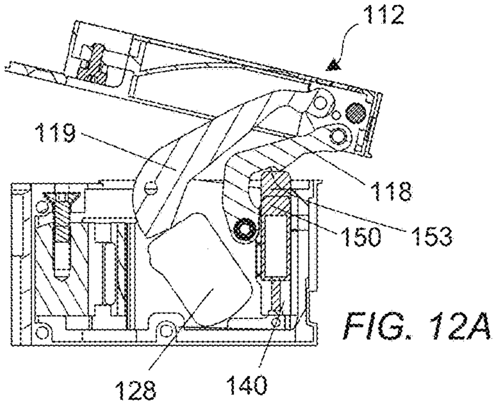
FIGS. 12A and 12B are views similar to those of FIGS. 11A and 11B, respectively, in which a projecting decelerator is provided which is actuated directly by one of the connecting rods instead of by the movable part.
Figure 12B:
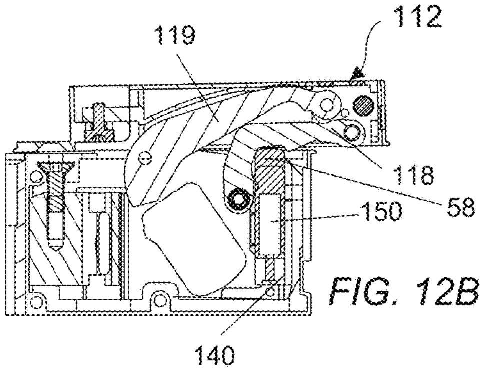

Advantageously, the hinge 110 also maintains the arrangement for using a partially protruding damper 150 to be applied to a seat 140, which is entirely similar to the damper 40 described with reference to the hinge 10, as shown in the sections of FIGS. 12A and 12B, showing the hinge with the door in the closing phase and fully closed, respectively.

With such a configuration, the hinge 110 can alternatively provide a first damper 150 housed in a first seat 140 provided at one end of the fixed body and operable by means of a nose 153 of the connecting rod 118 and a second damper 155 housed in a second seat 145 provided beyond the pivot point 116 of the connecting rod 119 and operable directly from the movable part 112 through the motion of the door.

This dual arrangement for the decelerator allows to have a single product which can adapt to the most various applications, depending on the required damping performance and customer preferences, simply by installing the decelerator in one seat or in the other.

Moreover, while a protruding damper 155 might present an aesthetic "disadvantage" compared to the partially protruding damper 150, on the other side the customer would have the advantage of being able to replace only the damper in case of breakage thereof, or to replace it for a more or less powerful unit depending on the weight of the door.

Figure 13A:
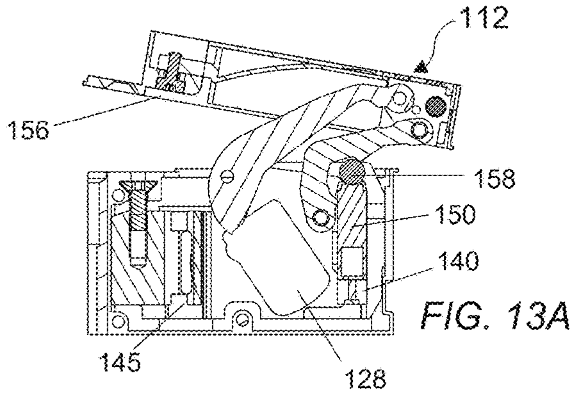
FIGS. 13A and 13B are views similar to those of FIGS. 12A and 12B, respectively, in which the decelerator is inside the fixed part and a partially protruding roller is provided for its actuation, operated by one of the connecting rods.
Figure 13B:
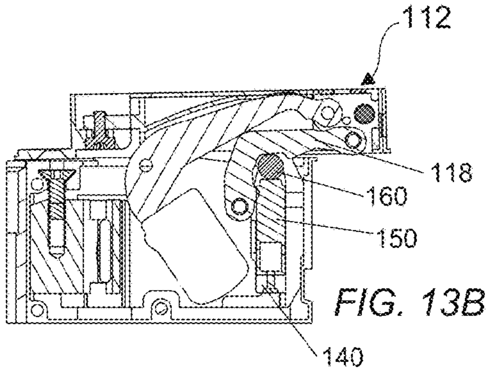

In the cross-sectional views of FIGS. 13A and 13B an alternative version of the hinge 110 is shown in which the damper 150 no longer protrudes, but an intermediate roller 158 is applied at its end, partially protruding from the fixed part 111, in order to "more gently" transmit the motion from the connecting rod 118 to the decelerator, thereby reducing the friction between said elements.

Advantageously, the hinge 110 can have all or some of the vertical, front and lateral adjustment means as described above with reference to the hinge 10. In particular, advantageously, the hinge 110 has lateral adjustment means provided in the movable part 112, preferably in the form of an eccentric body 125.

According to a further aspect of the invention, with particular reference to FIGS. 14 to 23, a swing door hinge is now described having the characteristics described so far and allowing an innovative mounting of the fixed part to the furniture structure.

Figure 14:
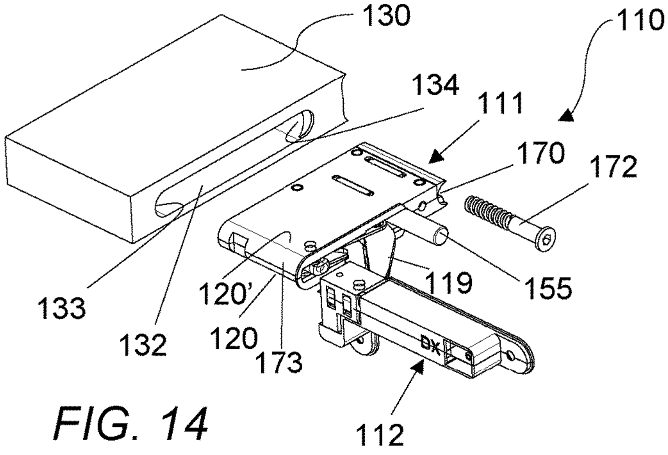
FIG. 14 is an axonometric view showing a hinge to be applied to a seat formed in a top or base of a piece of furniture, showing another aspect of the invention.

FIG. 14 shows a hinge 110 before being inserted in a seat 132 formed in the thickness of a top or base of a piece of furniture. The seat 132 has an elongated cross-section for receiving the flat fixed body of the hinge, with two rounded side edges 133, 134, and is typically obtained by milling, as conventional in this field.

The hinge 110, as already discussed, has a fixed part 111 and a movable part 112 connected together by a pair of connecting rods 118, 119. Hinge 110 may include all the components of hinge 10 described above, to which reference is made for the similarities between the components provided.

In particular, as described above, the fixed body 111 of the hinge 110 is formed by two half-shells, a lower half-shell 120 and an upper half-shell or cover 120' which enclose and contain, at least partially, the components of the fixed part, and which can comprise, as already described, elastic means, deceleration devices, adjusting means, and so on.

The two half-shells 120, 120' have a substantially specular shape with respect to each other so that, once assembled, they give the fixed part 111 of the hinge the flat configuration shown in FIGS. 14-23. As clearly seen in these figures, the fixed part 111, unlike known hinges of this type, does not include flanges or extensions with holes for securing the hinge to the furniture seat.

The fixed part 111 of the hinge according to the present invention has a flattened shape such as that of the standard hinges, with a flattened cross section and a rounded lateral edge 173 so as to mate with the edge 133 of the seat 132. Unlike the standard hinges, however, the assembly of the two half-shells 120, 120' defines on the opposite lateral edge a sort of groove or recess 170, so that once the hinge has been inserted in the seat 132, a free space remains between the groove 170 of the fixed body 111 and the edge 134 of the seat 132.

Figure 15:
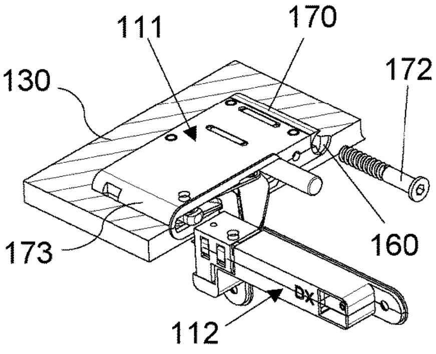
FIG. 15 is an axonometric view showing the hinge of FIG. 14 applied to a seat in the piece of furniture, with the piece of furniture shown in section.
Figure 17B:
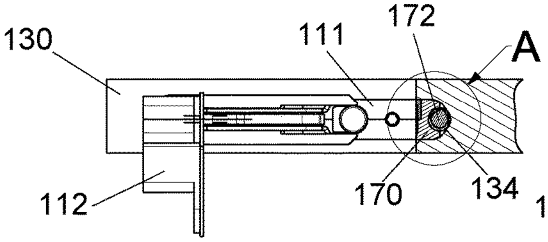
FIG. 17B is a partially sectional view taken along the line B-B of FIG. 17.

FIG. 15 shows the hinge 111 applied in the seat 132 (shown in section for better visualization). From this figure it is appreciated that there is a space 160, with a substantially circular profile, defined between the groove 170 and the edge of the corresponding seat, while substantially no space is created at the other edge 173.

The space 160 is intended solely to receive a dedicated fixing screw 172 for mounting the hinge to the structure of the piece of furniture. In practice, the proposed solution allows to eliminate the conventional fastening method via holes and flanges protruding from the fixed part of the hinge, since the lateral edge 170 of the fixed part itself is used to ensure the fixing. In fact, the screw 172 is driven into the furniture material, pressing the hinge into the milled seat 132, thus ensuring a stable coupling between the furniture body and the hinge.

Figure 16:
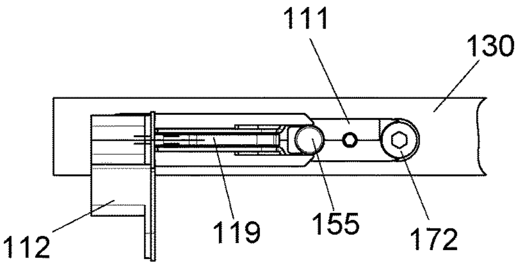
FIG. 16 is a front view showing the hinge of FIG. 15 applied to the seat of the piece of furniture.
Figure 17:
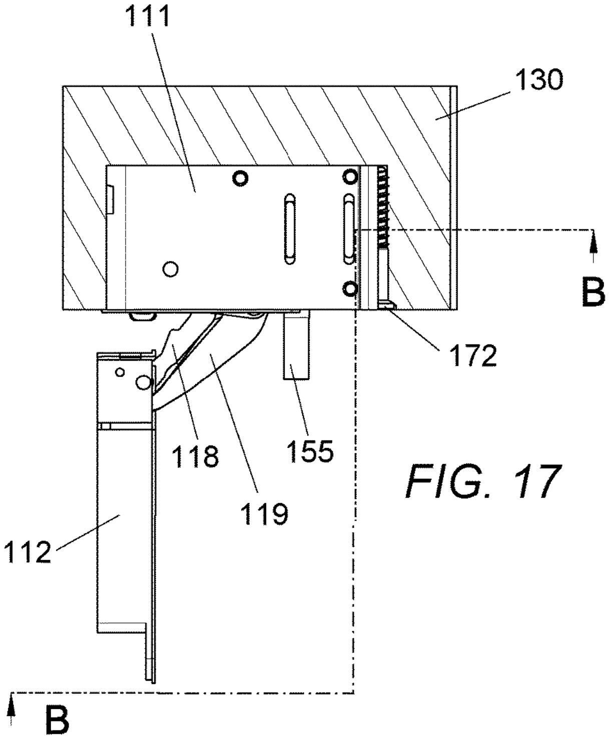
FIG. 17 is a top plan view of the view of FIG. 15.

FIG. 16 is a front view showing the hinge with the fixed part 111 inserted in the seat of the piece of furniture 130, fixed by means of the screw 172, while FIG. 17 is a top plan view substantially corresponding to the axonometric view of FIG. 15, with the screw 172 inserted in the seat 160.

Figure 18:
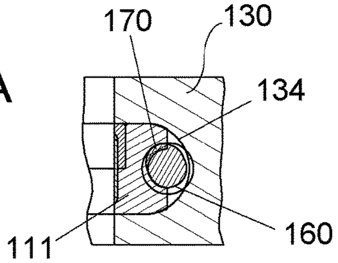
FIG. 18 is an enlarged view of the detail indicated by the letter A in FIG. 17B.

From these figures, as well as from the section view 17B taken along the broken line B-B of FIG. 17 and from FIG. 18, which is an enlargement of the area indicated by A in FIG. 17, the coupling between the hinge 110 and the seat 132 by means of the screw 172 is better visible.

As mentioned, once the fixed body 111 has been inserted into the seat 132, a space 160 is created between the grooved edge 170 and the edge of the seat 134, suitable for the insertion of the fixing screw. By screwing the screw 172 into this space 170, the screw 172 is caused to engage with the groove 170 and the edge 134 of the seat. The pressure generated between these elements tends to push the fixed part of the hinge to the left, locking it in the seat 132, and is such as to ensure the fastening of the hinge to the piece of furniture.

A further variant of the fastening mode is shown in FIGS. 19 to 23. In this variant, the mounting of the hinge 110 does not take place directly in the seat 132, but rather a kind of tray or container 180 is interposed between them.

Figure 19:
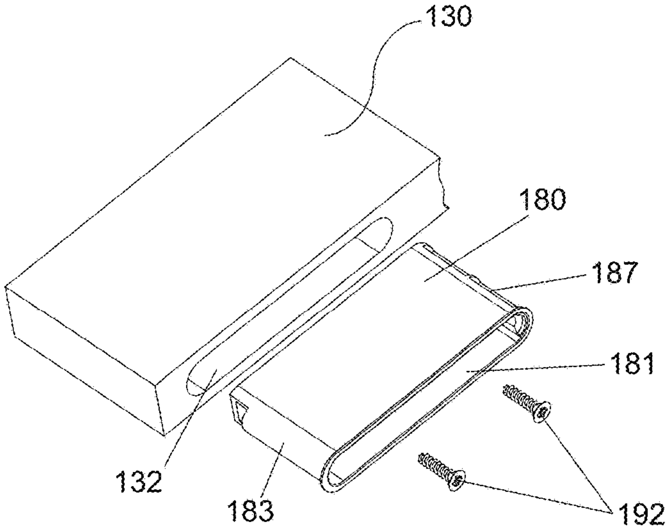
FIG. 19 is an exploded perspective view of a tray to be applied to a seat formed in a portion of furniture for the installation of a hinge according to a further aspect of the invention.

The tray 180 is generally flattened as shown in FIG. 19, with a front opening 181 of such a section as to receive the fixed part 111 of the hinge 110, as defined above. For this purpose, the tray has an elongated section with two rounded side edges 183, 187 such as to be in turn complementarily inserted and enveloped by the seat 132, which is sized to accommodate it.

Figure 19A:
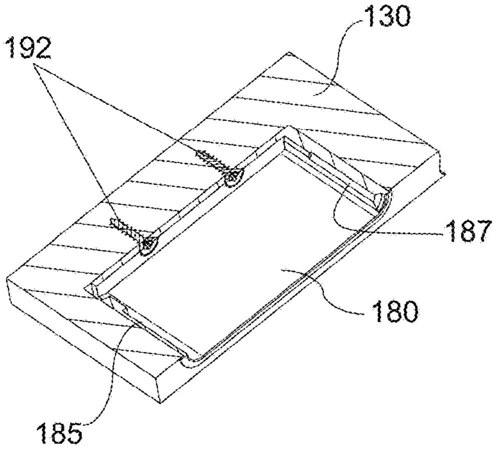
FIG. 19A is a sectional view, taken along a horizontal median plane, of the portion of the piece of furniture of FIG. 19 with the tray inserted in the seat.

The tray 180 has a bottom or abutment surface 186 opposite the opening 181 on which a pair of holes is provided to allow the tray to be secured to seat 132 by means of a pair of screws 192, as shown in the axonometric section view of FIG. 19*a*.

Figure 20:
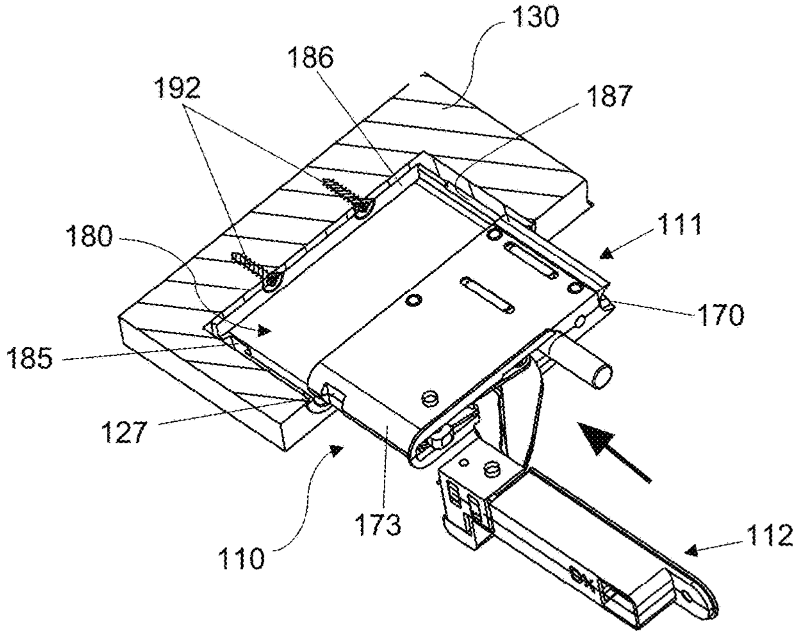
FIG. 20 is an axonometric view showing the hinge according to the invention during insertion into the seat of the piece of furniture shown in FIG. 19*a*.

Advantageously, moreover, the tray has on the inner surface of the lateral edge 183 a protrusion or indentation 185 substantially complementary to a dedicated fixing groove 127 provided on the edge 173 of the fixed part of the hinge, as shown in FIG. 20, in which the insertion of the hinge in the seat of the piece of furniture to which a tray 180 has been previously applied is schematically shown.

The mounting of the hinge 110 in the seat by means of the tray 180 is further schematized in the plan views according to FIGS. 21A to 22C.

Figure 22A:
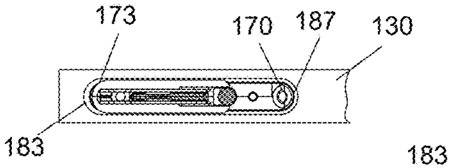
FIGS. 22A-22C are front views, sectioned at the edge of the fixed part of the hinge, corresponding respectively to the views of FIGS. 21A-21C.
Figure 21A:
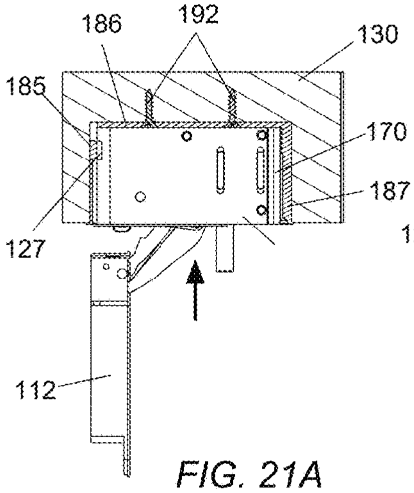
FIGS. 21A-21C are top plan views showing the sequence of steps for fixing the hinge of FIG. 20 in the tray inserted in the seat of the piece of furniture.

FIG. 21A, which is a schematic top view with the portion of the piece of furniture 130 in section, and FIG. 22*a* which is a corresponding front view, illustrate a situation in which the fixed part 111 has been inserted into the tray 180, but has not yet been fixed to the seat.

In this situation, since the longitudinal dimension of the opening 181 of the tray 180 is slightly greater than the length of the fixed part 111, the coupling between the fixed part and the tray is such as to allow a lateral sliding of the fixed part. FIG. 22A shows a space between the edge 183 of the tray and the side edge 173 of the fixed part.

Figure 22B:
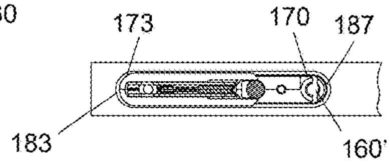
Figure 21B:
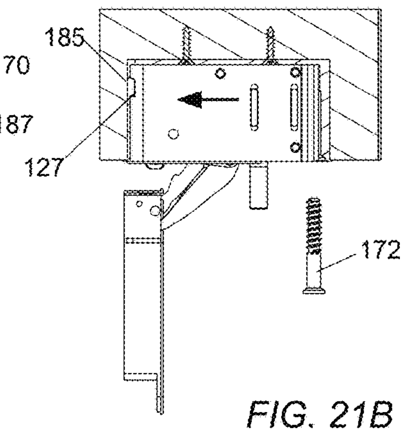

After insertion, the fixed part is laterally translated into the position shown in FIGS. 21B and 22B. In this situation, the space between the lateral edges 173 and 183 is reduced, while a space 160' has been created between the groove 170 and the opposite lateral edge 187 of the tray, intended to accommodate a screw 172.

In this condition, moreover, the groove 127 of the lateral edge 173 of the fixed body engages and couples with the indentation 185 provided on the edge of the tray, to which it is complementary.

Figure 22C:
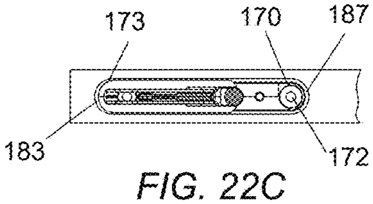
Figure 21C:
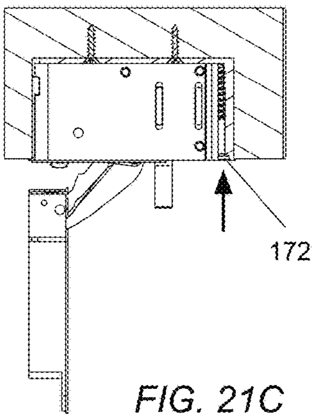

The fixed part of the hinge is secured to the tray by screwing the screw 172 into the space 160' between the groove 170 and the edge 187. FIGS. 21C and 22C show this condition. As in the previous case, screwing the screw results in coupling in part on the hinge and in part on the tray, which are put under mutual pressure in order to eliminate any movement. Secure fastening is further ensured, on the opposite edge, by the engagement between the indentation 185 and the groove 127, which prevents movement in the front direction.

Figure 23:
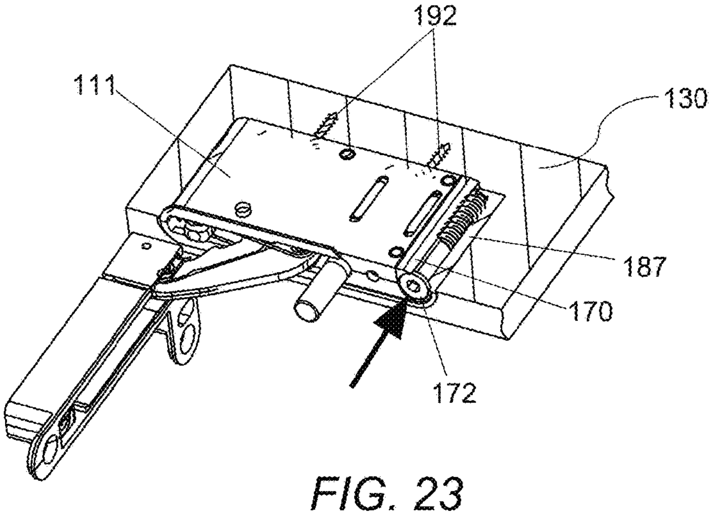
FIG. 23 is an axonometric view showing the hinge of FIG. 20 installed in the seat of the piece of furniture.

A hinge fully coupled to the housing of the piece of furniture by means of a tray and a fixing screw is illustrated in the axonometric view of FIG. 23.

From the above description, the advantages of a hinge for furniture with swing doors according to the invention, and its alternative embodiments, are evident.

In particular, a hinge with the lateral adjustment means in the movable part allows, on the one hand, to reduce the size of the fixed body, positively impacting the production thereof and the installation process, which is an extremely important aspect in this field, and on the other hand, to free up space for the provision of other components, such as the provision of an additional damper.

Not least, a hinge according to a further aspect of the invention has undoubted installation advantages, providing a fixed part that can be directly fixed to the milled seat in the thickness of the piece of furniture, thus eliminating the flange protruding from said fixed part and avoiding additional and unesthetic fixing holes.

Naturally, the present invention is not limited to the particular embodiments described above and illustrated in the accompanying drawings, but numerous modifications and variations may be made by a person skilled in the art without thereby departing from the scope of the invention as defined in the appended claims.

The invention claimed is:

1. A hinge for opening and closing swing doors of furniture, comprising a fixed part shaped to be housed in a seat obtained in a horizontal plane of a base or a top of the structure of a piece of furniture, and a movable part configured to be inserted in a seat obtained in a door of the piece of furniture, said hinge being provided with a movement mechanism comprising a pair of levers or connecting rods connecting two pivot points provided on said fixed part of the hinge to two pivot points provided on the movable part for operating the door in opening and closing, wherein said movable part houses means for vertical adjustment of the position of the door with respect to the furniture, the actuation of which causes a translation of the movable part with respect to the fixed part along a vertical direction, wherein said movable part comprises a first body, in which said vertical adjustment means of the door are housed, and to which the ends of the connecting rods connecting the fixed part and the movable part are hinged, and a second body intended to be fixed to said seat obtained in the furniture door, between said first and second bodies being arranged means for lateral adjustment of the position of the door, the operation of which causes a sliding of said second body with respect to said first body and therefore a horizontal translation of the door with respect to the furniture structure along a direction parallel to the front surface of the furniture.

2. Hinge according to claim 1, wherein said lateral adjusting means comprise an eccentric body, disposed between said first and second bodies of said movable part, the rotation of which causes said second body to slide with respect to said first body.

3. Hinge according to claim 2, wherein said first body of the movable part has a substantially box-like or hollow parallelepiped structure and said second body has also a box-like or hollow parallelepiped structure with an opening such that it can accommodate the first body, on which it can slide.

4. Hinge according to claim 3, wherein said first body has a flange at the end opposite to that in which it is pivoted to the connecting rods, provided with a hole, and said second body has, at the corresponding end, a housing provided with a hole or window such that, in use after the coupling between the first body and the second body has taken place, the hole on the flange is located behind the window, through which a stem of the eccentric body passes, to engage the hole.

5. Hinge according to claim 1, wherein said fixed part houses means for front adjustment of the position of the door with respect to the furniture body, the actuation of which causes a translation of the movable part with respect to the fixed part along a direction perpendicular to said front surface of the furniture.

6. Hinge according to claim 1, further comprising elastic means housed in a seat obtained in the fixed part and operatively connected to one of the connecting rods designed to exert a closing thrust on the door.

7. Hinge according to claim 1, wherein said fixed part has a seat, arranged between one of the two pivot points and a lateral edge of the fixed part, for housing a deceleration device designed to dampen part of the closing movement of the hinge, wherein, in use, said deceleration device protrudes, with an extension, or with an additional element from the fixed part and is actuated directly by one of the two connecting rods, by means of a nose section of the connecting rod acting directly on said extension or additional element of the deceleration device.

8. Hinge according to claim 1, wherein the fixed part has a seat arranged between one of the two pivot points and a lateral edge thereof for housing a deceleration device designed to dampen at least part of the closing movement of the door, which, when the hinge is open, is partly housed in said seat and partly protrudes from the fixed part in order to be operated in closing directly by the movable part of the hinge.

9. Hinge according to claim 1, wherein said fixed part has a flattened shape with a rounded lateral edge such as to couple with a corresponding edge of a seat formed in the thickness of a top or a base of a piece of furniture, and an opposite lateral edge having an external groove such as to create with a corresponding edge of said seat a substantially circular space, suitable for receiving a fixing screw.

10. Hinge according to claim 1, wherein said fixed part has a flattened shape with a rounded lateral edge so as to couple with a corresponding edge of a tray housed in a seat obtained in the thickness of a top or of a base of a piece of furniture, and the opposite lateral edge having an external groove such as to determine with a corresponding edge of said tray a substantially circular space, apt to accommodate a fixing screw.

11. Hinge according to claim 10, wherein said tray has on the inner surface of said lateral edge a protrusion or indentation substantially complementary to a groove provided on the corresponding edge of the fixed part of the hinge, for securely locking the hinge in the tray.

* * * * *